United States Patent [19]
Teranishi et al.

[11] Patent Number: 4,939,573
[45] Date of Patent: Jul. 3, 1990

[54] COLOR FILTER ARRANGEMENT COMPRISING TRANSPARENT OR WHITE FILTERS FOR SOLID STATE COLOR IMAGING APPARATUS

[75] Inventors: Nobukazu Teranishi; Akiyoshi Kohno, both of Tokyo, Japan

[73] Assignee: NEC Corporation, Japan

[21] Appl. No.: 361,669

[22] Filed: May 31, 1989

Related U.S. Application Data

[63] Continuation of Ser. No. 246,899, Sep. 16, 1988, abandoned, which is a continuation of Ser. No. 105,967, Oct. 2, 1987, abandoned, which is a continuation of Ser. No. 8,093, Jan. 23, 1987, abandoned, which is a continuation of Ser. No. 590,693, Mar. 19, 1984, abandoned.

[30] Foreign Application Priority Data

Mar. 17, 1983 [JP] Japan .................................. 58-44737
Sep. 5, 1983 [JP] Japan .................................. 58-162745

[51] Int. Cl.$^5$ ............................................ H04N 9/077
[52] U.S. Cl. ........................................ 358/44; 358/43
[58] Field of Search ......................... 358/43, 44, 48, 41

[56] References Cited

U.S. PATENT DOCUMENTS

| 4,437,112 | 2/1984 | Tanaka et al. | 358/44 |
| 4,460,919 | 7/1984 | Takemura | 358/44 |
| 4,670,777 | 6/1987 | Ishikawa et al. | 358/44 |

FOREIGN PATENT DOCUMENTS

| 58-198979 | 11/1983 | Japan | 358/44 |
| 58-211718 | 12/1983 | Japan | 358/44 |

Primary Examiner—Edward L. Coles, Sr.
Assistant Examiner—Randall S. Svihla
Attorney, Agent, or Firm—Laff, Whitesel, Conte & Saret

[57] ABSTRACT

White, yellow, and cyan color filters are superposed in rows and columns on picture elements of a solid-state color imaging apparatus. In each recurring cycle of four-row and two-column filters, the green component of light is transmitted through all filters.

7 Claims, 10 Drawing Sheets

ARRANGEMENT OF COLOR FILTERS

INTERLINE TRANSFER CCD ELEMENT

READOUT SIGNAL CHARGES

ARRANGEMENT OF COLOR FILTERS $\ell_1 + \ell_2$ $\ell_3 + \ell_4$ $\ell_2 + \ell_3$ $\ell_4 + \ell_5$

COLOR OUTPUT SIGNALS

SINGLE-PLATE COLOR IMAGING DEVICE

ARRANGEMENT OF COLOR FILTERS

ARRANGEMENT OF COLOR FILTERS

ARRANGEMENT OF COLOR FILTERS

ARRANGEMENT OF COLOR FILTERS

| | | | | | | |
|---|---|---|---|---|---|---|
| W | Cy | W | Cy | W | Cy | $\ell_1$ |
| W | Ye | W | Ye | W | Ye | $\ell_2$ |
| Cy | W | Cy | W | Cy | W | $\ell_3$ |
| W | Ye | W | Ye | W | Ye | $\ell_4$ |
| W | Cy | W | Cy | W | Cy | $\ell_5$ |
| W | Ye | W | Ye | W | Ye | $\ell_6$ |
| Cy | W | Cy | W | Cy | W | $\ell_7$ |
| W | Ye | W | Ye | W | Ye | $\ell_8$ |

ARRANGEMENT OF COLOR FILTERS

*FIG. 11*

| | | | | | | |
|---|---|---|---|---|---|---|
| W | G | W | G | W | G | $\ell_1$ |
| W | W | W | W | W | W | $\ell_2$ |
| Cy | Ye | Cy | Ye | Cy | Ye | $\ell_3$ |
| W | W | W | W | W | W | $\ell_4$ |
| W | G | W | G | W | G | $\ell_5$ |
| W | W | W | W | W | W | $\ell_6$ |
| Cy | Ye | Cy | Ye | Cy | Ye | $\ell_7$ |
| W | W | W | W | W | W | $\ell_8$ |

ARRANGEMENT OF COLOR FILTERS

*FIG. 12*

ARRANGEMENT OF COLOR FILTERS

COLOR OUTPUT SIGNALS

ARRANGEMENT OF COLOR FILTERS

ARRANGEMENT OF COLOR FILTERS

COLOR FILTER ARRANGEMENT COMPRISING TRANSPARENT OR WHITE FILTERS FOR SOLID STATE COLOR IMAGING APPARATUS

This application is a continuation of application Ser. No. 07/246,899, filed 9/16/88, which was a continuation of Ser. No. 07/105,967, filed 10/2/87, which was a continuation of Ser. No. 07/008,093, filed 1/23/87, which was a continuation of Ser. No. 06/590,693, filed 3/19/84, all now abandoned.

This invention relates to a solid-state color imaging apparatus.

A filter is described herein as being transparent or white when it passes visible light and appears transparent to the human eye.

An interline transfer CCD imaging element (hereinbelow, abbreviated to "IL-CCD imaging element") comprises a plurality of picture elements arrayed regularly in both a horizontal direction and a vertical direction. Vertical CCD registers transfer, in the vertical direction, signal charges which are photoelectrically converted by and stored in the picture elements. At the end of the vertical column, a horizontal CCD register transfers them in the horizontal direction to an output portion.

The IL-CCD imaging element is capable of two sorts of read-out operations which are a frame storage operation in which the signal charges stored in the picture elements are read out during every frame period, and a field storage operation in which they are read out during every field period. The field storage operation requires a half of the frame storage time, and gives a lesser feeling of afterimage. For this reason, the development of a single-plate color imaging device for effecting the field storage operation is being promoted.

In color imaging by the use of the IL-CCD imaging element, the color dispersion images of a subject are formed by color filters. The color dispersion images are picked up by the IL-CCD imaging element. The output signals of the IL-CCD imaging element are processed, thereby to obtain chrominance and luminance signals.

A conventional IL-CCD color imaging apparatus having a conventional color filter has a disadvantage, to be described below. A row of the color filter is a repetition of yellow (Ye) and light transmitting film green (G), which produce no signal for blue light. This absence of a blue signal has led to the disadvantage that, even when a blue linear image falls on the picture elements of the row, the corresponding signal is not included in the output signal of the IL-CCD imaging element.

More specifically, the color filters have the recurrence cycles of two picture elements in the horizontal direction and four picture elements in the vertical direction. In the resulting recurrence unit of eight picture elements, there are only two picture elements which give the blue signal. There are also only two picture elements which give the red signal. This has led to the disadvantage that, when a fine pattern in red or blue appears in a picture, a faithful output signal is not obtained.

It is, therefore, an object of this invention to provide a solid-state color imaging apparatus capable of producing faithful output signals even for very fine patterns.

According to this invention, there is a solid-state color imaging apparatus. In the array of the recurrence cycles of two picture elements in the horizontal direction and four picture elements in the vertical direction, each horizontal row includes at least one picture element giving the red signal and at least one picture element giving the blue signal.

The features and advantages of this invention will be understood from the following detailed description of a preferred embodiment, taken in conjunction with the accompanying drawings, wherein:

FIGS. 8, 9, 10, 11, 12 and 13 are schematic partial plan views showing the arrangements of color filters and the mutual relationships between the color filters and picture elements in accordance with the second to seventh embodiments of this invention;

Figure 15:
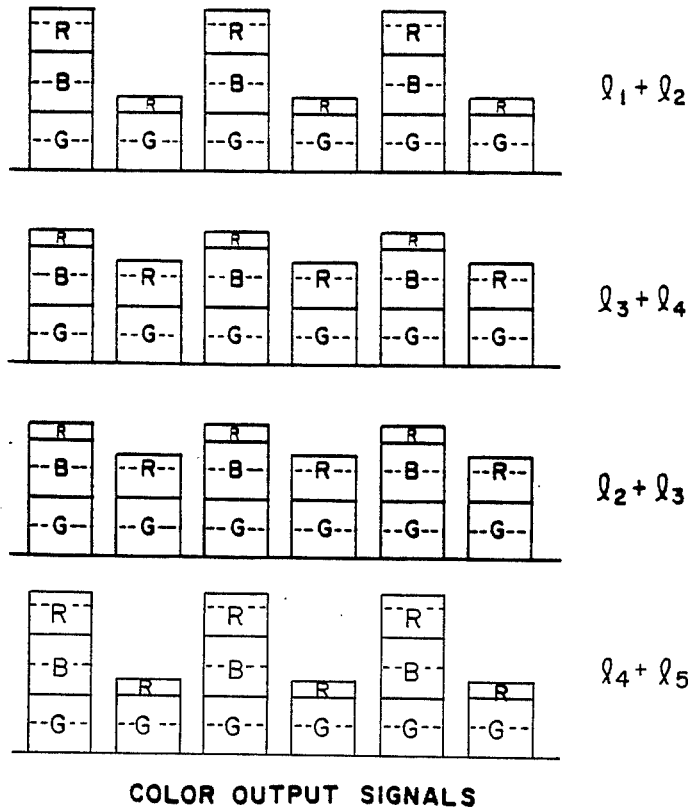
Figure 16:
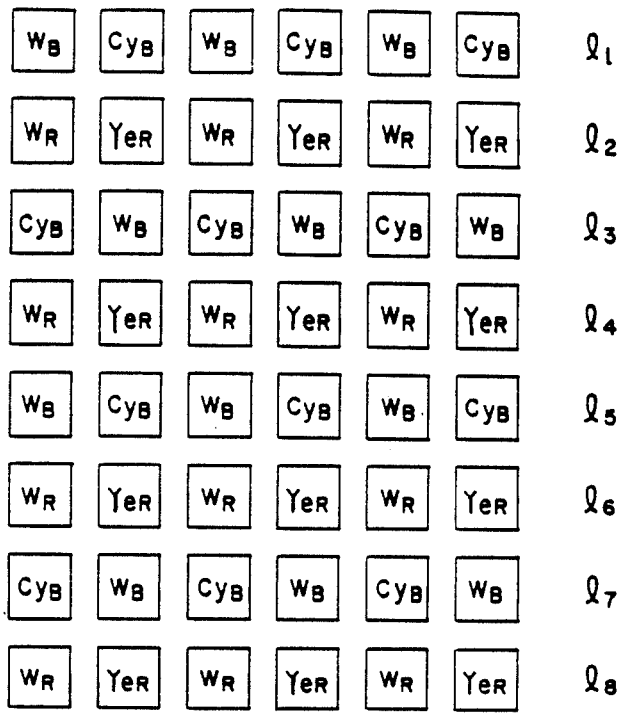
Figure 18:
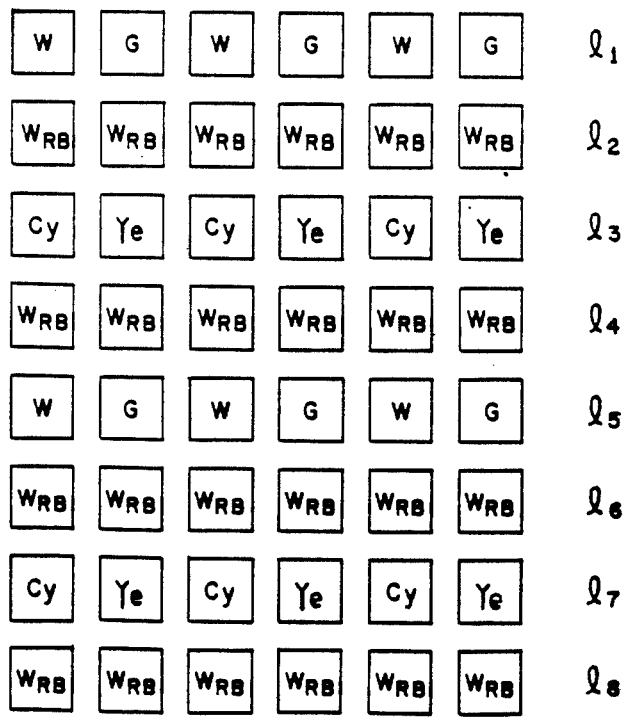

FIG. 15 is a diagram schematically showing the outputs of respective color signals from an interline transfer CCD imaging apparatus according to the seventh embodiment; and FIGS. 16 and 18 are schematic partial plan views each showing the arrangement of color filters and the mutual relationships between the color filters and picture elements in a solid-state imaging apparatus according to the eighth and ninth embodiments of this invention.

First, a conventional CCD color imaging apparatus will be described with reference to FIGS. 1 through 5.

A conventional IL-CCD imaging element (FIG. 1) comprises picture elements 1 arrayed regularly in a horizontal direction and a vertical direction. Vertical CCD registers 2 transfer, in the vertical direction, signal charges which are photoelectrically converted by and stored in the picture elements 1. At the ends of the vertical columns, a horizontal CCD register 3 transfers them in the horizontal direction, to an output portion 4. Arrows are used in FIG. 1 to indicate the transfer directions of the signal charges.

Figure 1:
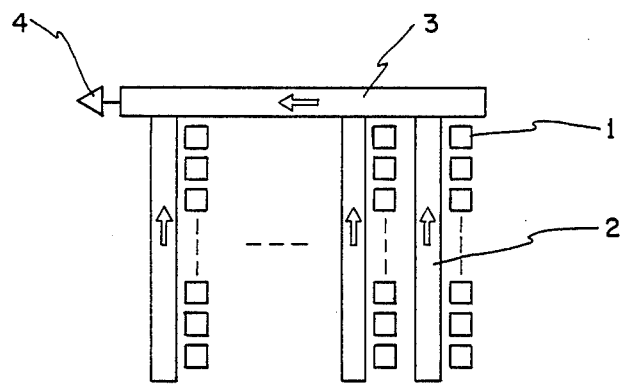
FIG. 1 is a schematic plan view of an interline transfer CCD imaging element.
Figure 2:
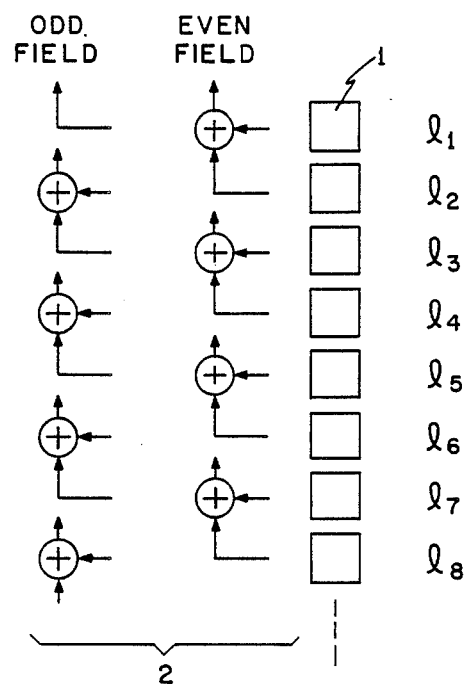
FIG. 2 is a diagram schematically showing the read-out of signal charges in the interline transfer CCD imaging element in a field storage mode.

FIG. 2 schematically illustrates the field storage operation. Rows in the horizontal direction are successively marked $l_1$, $l_2$, $l_3$, ..., $l_8$ ..., beginning with a certain row. In odd-numbered fields, the signal charges are first transferred to the vertical CCD registers 2 from the picture elements corresponding to lines or rows $l_2$, $l_4$, $l_6$, $l_8$, .... The signal charges corresponding to one picture element are subsequently shifted by the shift operation of each vertical CCD register 2. Further, the signal charges are transferred to the vertical CCD registers 2 from the picture elements corresponding to lines or rows, $l_1, l_3, l_5, l_7, \ldots$. As a result, the signal charges of the picture elements corresponding to lines or rows $l_2, l_4, l_6, l_8, \ldots$ are respectively added with the signal charges of the picture elements corresponding to lines or rows $l_1, l_3, l_5, l_7, \ldots$ in the vertical CCD registers 2. The signal charges of each of the lines or rows $l_1+l_2, l_3+l_4, l_5+l_6, l_7+l_8 \ldots$ are added and used as a signal for one horizontal period.

In even-numbered fields, the combinations of the rows of the picture elements in the horizontal direction which are to be added in the vertical CCD registers 2 are changed into lines or rows $l_2+l_3, l_4+l_5, l_6+l_7, \ldots$. The combinations of the two respectively adjacent rows in the vertical direction are changed every field, in this manner, thereby performing an interlaced operation.

In color imaging by the use of the IL-CCD imaging element, as stated above, the color dispersion images of a subject are formed by color filters. The color dispersion images are picked up by the IL-CCD imaging element. The output signals of the IL-CCD imaging element are processed, to obtain chrominance signals and luminance signals.

Figure 3:
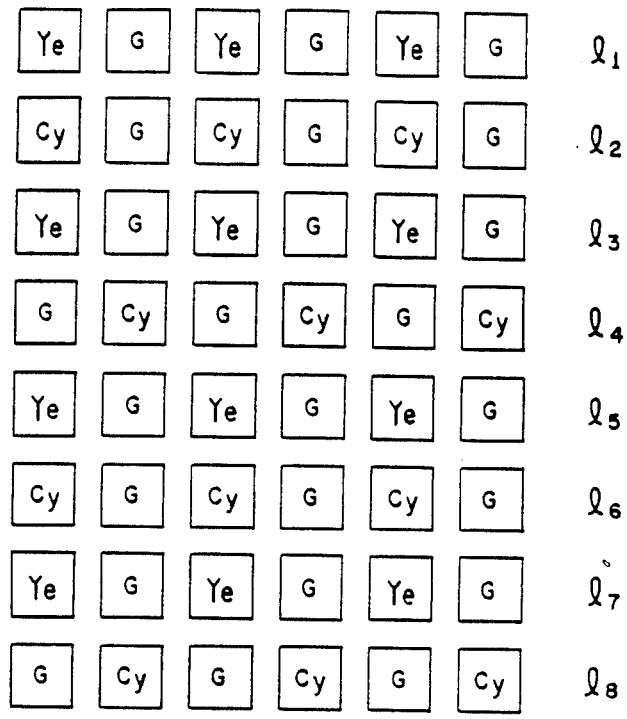
FIG. 3 is a schematic partial plan view showing the arrangement of color filters and the mutual relationships between the color filters and picture elements in a conventional color imaging apparatus.

FIG. 3 is a schematic partial plan view showing the color arrangement of the color filters as used in a conventional single-plate color imaging apparatus of the field storage operation also showing the mutual relationships between the color filters and the picture elements.

Referring to FIG. 3, the plurality of picture elements 1 are regularly arranged in the horizontal direction and in the vertical direction. The color filters are formed on the respective picture elements 1. The letters Ye, Cy and G indicate the color filters for yellow, cyan and green, respectively. The yellow color filter transmits red and green light, while the cyan color filter transmits blue and green light. The color filters are arrayed with two picture elements forming one cycle in the horizontal direction and with four picture elements forming one cycle in the vertical direction. The rows in the horizontal direction are identified as lines or rows $l_1, l_2, l_3, \ldots, l_8, \ldots$ successively from a certain row. From the left toward the right in the horizontal direction, filters Ye and G are alternately and repeatedly arranged in the horizontal rows $l_1$ and $l_5, \ldots$; filters Cy and G are alternately arranged in the next rows $l_2$ and $l_6, \ldots$; filters Ye and G in the next rows $l_3$ and $l_7, \ldots$; and filters G and Cy in the next rows $l_4$ and $l_8, \ldots$.

Figure 4:
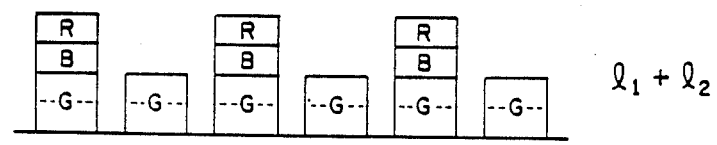
FIG. 4 is a diagram schematically showing the outputs of respective color signals from an interline transfer CCD imaging which is furnished with the color filters in FIG. 3.
Figure 4:
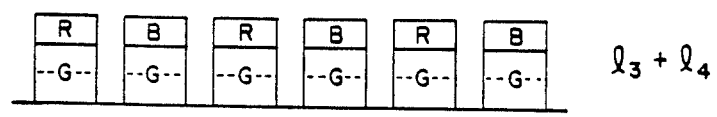
Figure 4:
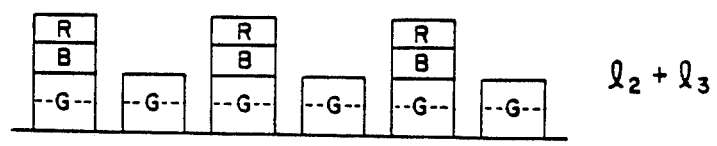
Figure 4:
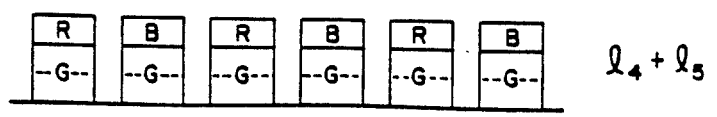

FIG. 4 is a diagram schematically showing the magnitudes of the outputs of the color signals from the respective picture elements, formed with the aforementioned color filters, in the case of the field storage operation. These color signals result from an array of filters, as shown in FIG. 3. The letters B, G and R respectively denote a blue signal, a green signal and a red signal, the ratios of which are set at 1:1:1. As illustrated in FIG. 4, when the output signals are averaged, $\frac{1}{2}B+2G+\frac{1}{2}R$ is obtained. This combination of signals is used as the luminance signal.

The blue signal is superposed as a modulation component $\frac{1}{2}B \cos \omega t$ with two picture elements forming one cycle in the horizontal direction. Here, $\omega$ denotes an angular frequency which corresponds to the cycle of two picture elements. The red signal is superposed as a modulation component $\frac{1}{2}R \cos \omega t$ with two picture elements forming one cycle in the horizontal direction.

That is, the output signal $S\{l_1+l_2\}$ of lines or rows $l_1+l_2$ is indicated by the following equation:

$$S\{l_1+l_2\} = \tfrac{1}{2}B + 2G + \tfrac{1}{2}R + \tfrac{1}{2}B \cos \omega t + \tfrac{1}{2}R \cos \omega t$$

In the output signal of lines or rows $l_3+l_4$, the blue signal is modulated in the opposite phase and the red signal is modulated in the same phase, with respect to the corresponding signals in the output signal of lines or rows $l_1+l_2$. The output signal $S\{l_3+l_4\}$ of lines or rows $l_3+l_4$ is indicated by the following equation:

$$S\{l_3+l_4\} = \tfrac{1}{2}B + 2G + \tfrac{1}{2}R - \tfrac{1}{2}B \cos \omega t + \tfrac{1}{2}R \cos \omega t$$

The outputs $S\{l_2+l_3\}$ and $S\{l_4+l_5\}$ of other fields are indicated by the following equations:

$$S\{l_2+l_3\} = \tfrac{1}{2}B + 2G + \tfrac{1}{2}R + \tfrac{1}{2}B \cos \omega t + \tfrac{1}{2}R \cos \omega t$$

$$S\{l_4+l_5\} = \tfrac{1}{2}B + 2G + \tfrac{1}{2}R - \tfrac{1}{2}B \cos \omega t + \tfrac{1}{2}R \cos \omega t$$

In the horizontal scanning period of lines or rows $l_2+l_3$ and the scanning period of lines or rows $l_4+l_5$, the blue signals are modulated in the opposite phases, and the red signals are modulated in the same phases.

Figure 5:
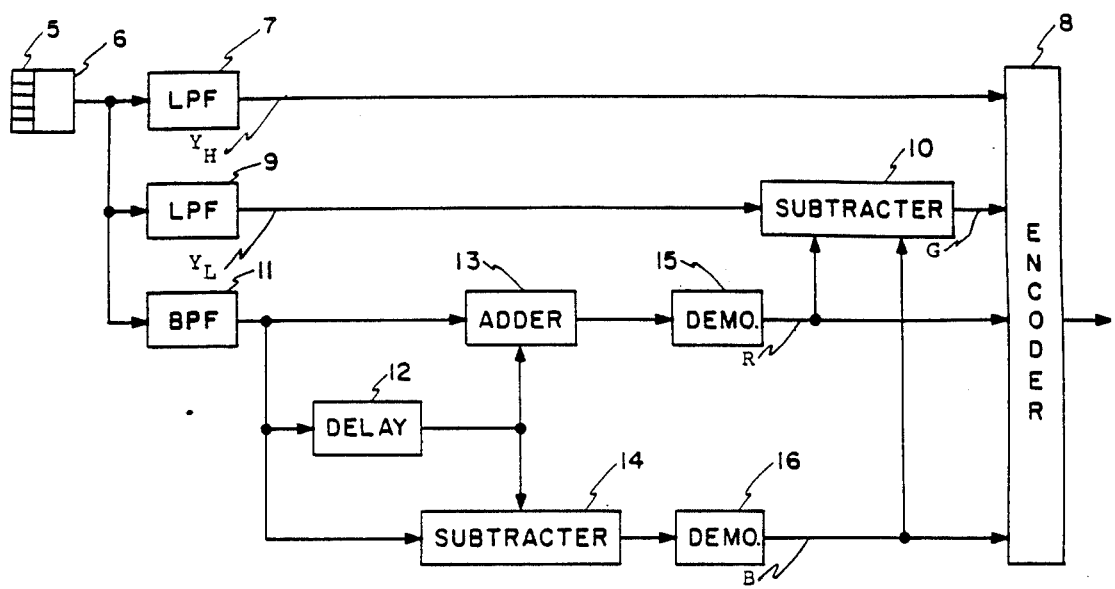
FIG. 5 is a schematic block diagram of a single-plate type color imaging device.

FIG. 5 is a schematic block diagram of the single-phase type of color imaging device. The output signal of the IL-CCD imaging element 6 is derived from the color filters 5, which are arrayed as stated above. The output signal is passed through a low-pass filter 7 in order to remove the modulation components and to become the luminance signal Y, which is applied to a color encoder 8. As indicated by the above equations, the luminance signal has a component of $\frac{1}{2}B+2G+\frac{1}{2}R$. Besides, the output signal of the IL-CCD imaging element 6 becomes a low frequency luminance signal when sent through a low-pass filter 9, having a pass band which is lower than that of the low-pass filter 6. The luminance signal is applied to a subtracter circuit 10. Further, the output signal of the IL-CCD imaging element 6 can separate the modulation components by passing them through a band-pass filter 11 having a center frequency which is a frequency corresponding to the recurrence cycle of two picture elements in the horizontal direction.

The modulation component $T\{l_1+l_2\}$ of the lines or rows $l_1+l_2$ is indicated by the following equation:

$$T\{l_1+l_2\} = \tfrac{1}{2}B \cos \omega t + \tfrac{1}{2}R \cos \omega t$$

The modulation components of the $l_3+l_4$ rows, $l_2+l_3$ rows and $l_4+l_5$ rows are indicated by the following equations:

$$T\{l_3+l_4\} = -\tfrac{1}{2}B\cos\omega t + \tfrac{1}{2}R\cos\omega t$$
$$T\{l_2+l_3\} = \tfrac{1}{2}B\cos\omega t + \tfrac{1}{2}R\cos\omega t$$
$$T\{l_4+l_5\} = -\tfrac{1}{2}B\cos\omega t + \tfrac{1}{2}R\cos\omega t$$

The output of the band-pass filter 11 is delayed by one horizontal scanning period, by means of a delay line 12. When the output of the band-pass filter 11 and the output of the delay line 12 are added by an adder circuit 13, the modulation component of the red signal is separated, as indicated by each of the following equations:

$$T\{l_1+l_2\} + T\{l_3+l_4\} = R \cos \omega t$$

$$T\{l_2+l_3\} + T\{l_4+l_5\} = R \cos \omega t$$

When the output of the delay line 12 and the output of the band-pass filter 11 are subtracted by a subtracter circuit 14, the modulation component of the blue signal is separated, as indicated by each of the following equations:

$$T\{l_1+l_2\} - T\{l_3+l_4\} = B \cos \omega t$$

$$T\{l_2+l_3\} - T\{l_4+l_5\} = B \cos \omega t$$

The separated modulation components of the red signal and blue signal are respectively demodulated by demodulator circuits 15 and 16, to obtain the red signal and blue signal. When the red signal and blue signal are subtracted from the low frequency luminance signal, in the subtracter circuit 10, the green signal is obtained. The luminance signal, green signal, red signal and blue signal thus obtained are applied to the color encoder 8, to obtain a color television signal.

The IL-CCD imaging apparatus, having the color filters as shown in FIG. 3, has a disadvantage to be described below. In FIG. 3, the row $l_3$, for example, is the repetition of filters Ye and G and, therefore, produces no signal for blue light. This absence of blue signal has led to the disadvantage that, even when a blue linear image falls on the picture elements of the row $l_3$, the corresponding signal is not included in the output signal of the IL-CCD imaging element.

More specifically, the color filters have the recurrence cycles of two picture elements in the horizontal direction and four picture elements in the vertical direction. In the resulting recurrence unit of eight picture elements, there are only two picture elements which give the blue signal. There are also only two picture elements which give the red signal. This has led to the disadvantage that, when there is a fine pattern of red or blue light, a faithful output signal is not obtained.

Figure 6:
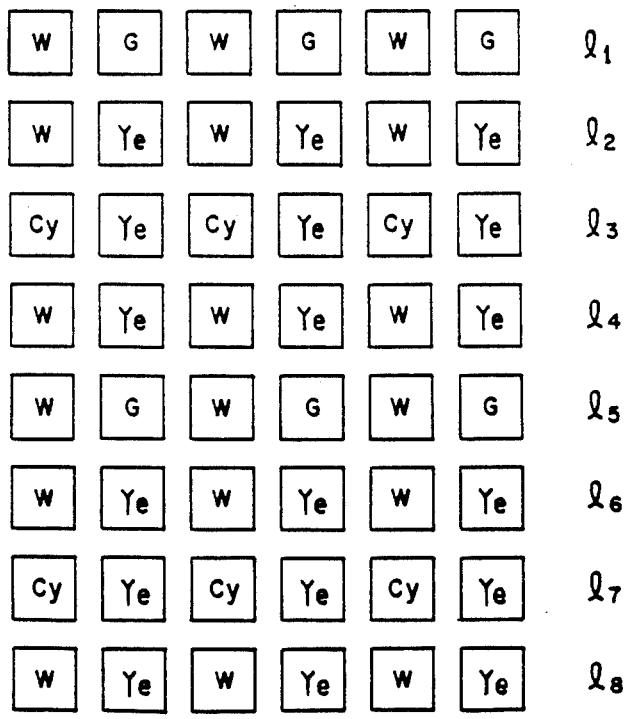
FIG. 6 is a schematic partial plan view showing the arrangement of color filters and the mutual relationships between the color filters and picture elements in accordance with a first embodiment of this invention.

FIG. 6 is a schematic partial plan view showing the arrangement of color filters and the mutual relationships between the color filters and picture elements in a first embodiment of this invention. The plurality of picture elements 1 are arranged regularly in both the horizontal direction and the vertical direction. The color filters are formed on the respective picture elements 1. The letter W indicates the color filter which is transparent and is herein sometimes called a white color filter. The white or transparent color filter transmits blue, green and red light. The color filters are arrayed in a cycle of two picture elements in the horizontal direction and of four picture elements in the vertical direction. The rows in the horizontal direction are successively identified by $l_1, l_2, l_3, \ldots, l_8, \ldots$, beginning with a certain row. From the left toward the right in the horizontal direction, the transparent and green filters W and G are alternately and repeatedly arranged in the horizontal rows $l_1$ and $l_5, \ldots$; the transparent and yellow filters W and Ye are in the next rows $l_2$ and $l_6, \ldots$; the cyan and yellow filters Cy and Ye are in the next rows $l_3$ and $l_7, \ldots$; and the transparent and yellow filters W and Ye are in the next rows $l_4$ and $l_8$.

Figure 7:
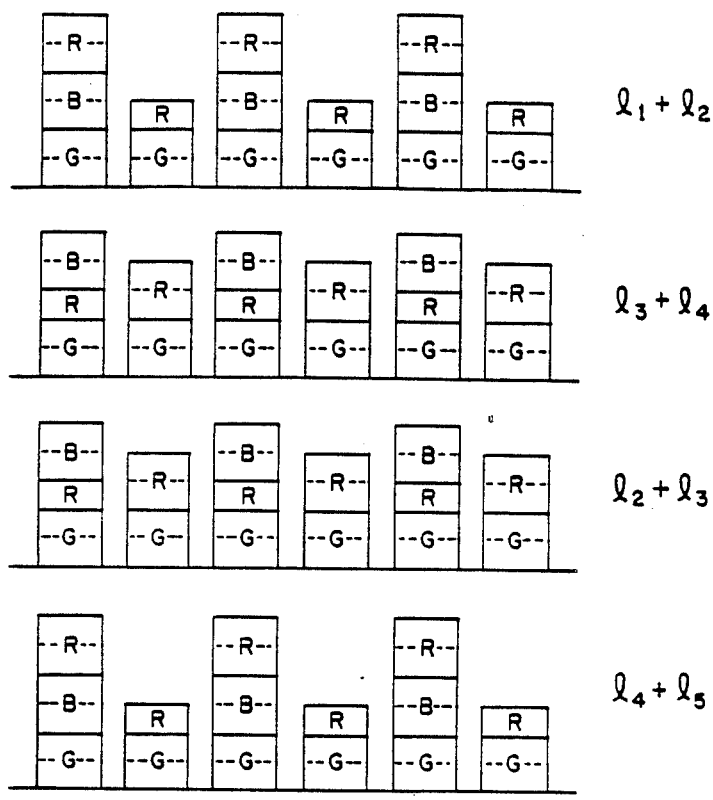
FIG. 7 is a diagram schematically showing the outputs of respective color signals from the first embodiment.

FIG. 7 is a diagram schematically showing the magnitudes of the outputs of the color signals taken from the respective picture elements formed with the aforementioned color filters in the field storage which corresponds to FIG. 6. As illustrated in FIG. 7, the average value of the output signals is $3/2 R + 2G + B$, which is used as the luminance signal. In the output signal of lines or rows $l_1+l_2$, the red signal is superposed as a modulation component $\frac{1}{2} R \cos \omega t$, with two picture elements forming one cycle in the horizontal direction. The blue signal is superposed as a modulation component $B \cos \omega t$, with two picture elements forming one cycle in the horizontal direction.

The output signal $S\{l_1+l_2\}$ of lines or rows $l_1+l_2$ is indicated by the following equation:

$$S\{l_1+l_2\} = 3/2 R + 2G + B + \frac{1}{2} R \cos \omega t + B \cos \omega t$$

In the output signal of lines or rows $l_3+l_4$, the red signal is modulated in the opposite phase and the blue signal is modulated in the same phase with respect to those in the output signal of lines or rows $l_1+l_2$. The ouput signals $S\{l_3+l_4\}$ of rows $l_3+l_4$ are indicated by the following equation:

$$S\{l_3+l_4\} = 3/2 R + 2G + B - \frac{1}{2} R \cos \omega t + B \cos \omega t$$

The outputs $S\{l_2+l_3\}$ and $S\{l_4+l_5\}$ of other fields are indicated by the following equations:

$$S\{l_2+l_3\} = 3/2 R + 2G + B - \frac{1}{2} R \cos \omega t + B \cos \omega t$$

$$S\{l_4+l_5\} = 3/2 R + 2G + B + \frac{1}{2} R \cos \omega t + B \cos \omega t$$

In the horizontal scanning periods of the $l_2+l_3$ rows and of the $l_4+l_5$ rows, the red signals are modulated in the opposite phases, and the blue signals are modulated in the same phases.

The output signal from the solid-state imaging element of the solid-state imaging apparatus of the first embodiment of this invention is decomposed into the luminance signal, green signal, red signal and blue signal by the apparatus shown in FIG. 5. The color television signal is produced by a color encoder.

The color filter in the first embodiment has the recurrence cycles of two picture elements in the horizontal direction and four picture elements in the vertical direction. In the resulting recurrence unit of eight picture elements, six picture elements provide the red signal and four picture elements provide the blue signal. These picture elements are a half or more of the total number. In FIG. 6, any horizontal row includes picture elements which give the red signal. For this reason, even when a linear red image corresponding to one horizontal row enters, by way of example, the corresponding signal is included in the output signal of the IL-CCD imaging element. The same applies to the blue signal. The solid-state imaging device according to this invention has the large numbers of picture elements for providing the red signal and blue signal. It can produce a faithful output signal even when a very fine pattern in red or blue enters.

In a second embodiment (FIG. 8) of this invention, from the left toward the right in the horizontal direction, transparent and yellow color filters W and Ye are repeatedly arranged in the horizontal rows $l_1$ and $l_5, \ldots$; transparent and cyan filters W and Cy in the next rows $l_2$ and $l_6, \ldots$; filters Ye and W in the next rows $l_3$ and $l_7, \ldots$; and filters W and Cy in the next rows $l_4$ and $l_8$.

The output signals of respective horizontal scanning lines in the field storage operation are indicated by the following equations:

$$S\{l_1 + l_2\} = 3/2R + 2G + 3/2B + \tfrac{1}{2}R\cos\omega t + \tfrac{1}{2}B\cos\omega t$$
$$S\{l_3 + l_4\} = 3/2R + 2G + 3/2B + \tfrac{1}{2}R\cos\omega t - \tfrac{1}{2}B\cos\omega t$$
$$S\{l_2 + l_3\} = 3/2R + 2G + 3/2B + \tfrac{1}{2}R\cos\omega t - \tfrac{1}{2}B\cos\omega t$$

-continued
$$S\{l_4 + l_5\} = 3/2R + 2G + 3/2B + \tfrac{1}{4}R\cos\omega t + \tfrac{1}{4}B\cos\omega t$$

The color filter in the second embodiment has the recurrence cycles of two picture elements in the horizontal direction and four picture elements in the vertical direction. In the resulting recurrence unit of eight picture elements, six picture elements give the red signal and six picture elements give the blue signal.

In a third embodiment (FIG. 9) of this invention, extending from the left toward the right white and green filters W and G are repeatedly arranged in the horizontal rows $l_1$ and $l_5$, . . . ; transparent filters W and W in the next rows $l_2$ and $l_6$, . . . ; yellow and cyan filters Ye and Cy in the next rows $l_3$ and $l_7$, . . . ; and filters W and W in the next rows $l_4$ and $l_8$.

The output signals of the respective horizontal scanning lines in the field storage operation are indicated by the following equations:

$$S\{l_1 + l_2\} = 3/2R + 2G + 3/2B + \tfrac{1}{4}R\cos\omega t + \tfrac{1}{4}B\cos\omega t$$
$$S\{l_3 + l_4\} = 3/2R + 2G + 3/2B + \tfrac{1}{4}R\cos\omega t - \tfrac{1}{4}B\cos\omega t$$
$$S\{l_2 + l_3\} = 3/2R + 2G + 3/2B + \tfrac{1}{4}R\cos\omega t - \tfrac{1}{4}B\cos\omega t$$
$$S\{l_4 + l_5\} = 3/2R + 2G + 3/2B + \tfrac{1}{4}R\cos\omega t + \tfrac{1}{4}B\cos\omega t$$

The color filter in the third embodiment has the recurrence cycles of two picture elements in the horizontal direction and four picture elements in the vertical direction. In the resulting recurrence unit of eight picture elements, six picture elements give the red signal and six picture elements give the blue signal.

Figure 8:
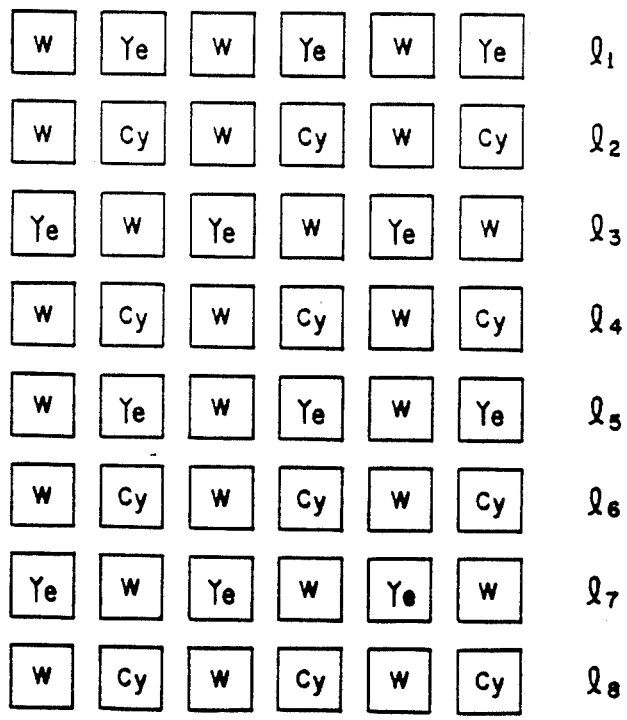
Figure 9:
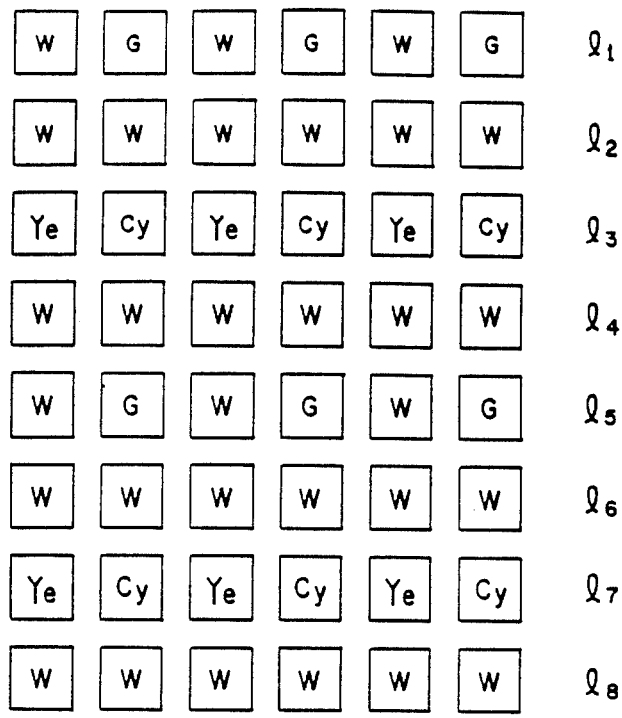
Figure 10:
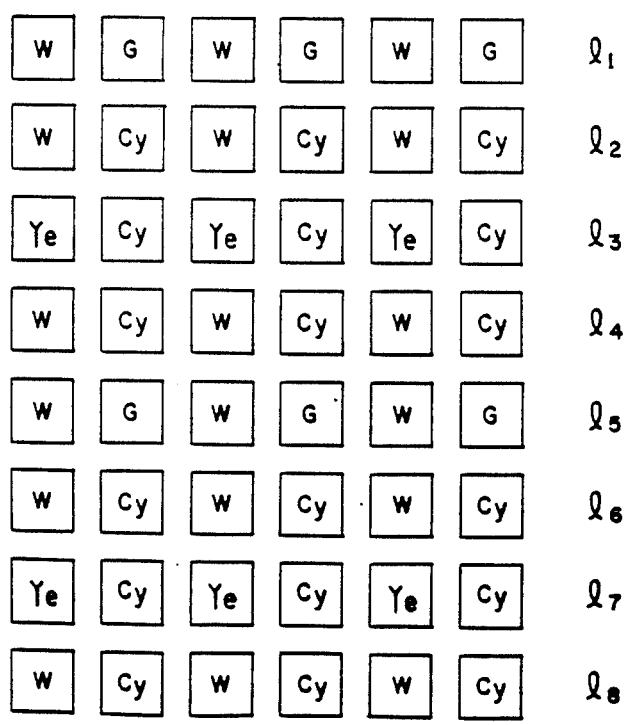

FIGS. 10, 11 and 12 show color filters used in fourth, fifth and sixth embodiments which are identical to the color filters in the first, second and third embodiments shown in FIGS. 6, 8 and 9, respectively, except that the filters Cy and Ye are exchanged with each other. The color imaging apparatus using the color filters shown in FIGS. 10, 11 and 12 can also produce the output signals which are like those produced in the first to third embodiments.

The luminance signal produced by each of the fifth and sixth embodiments is (3/2 R+2G+3/2 B), as described above. As before, the ratio of the quantities of red, green and blue light is designated R G B when a standard tungsten lamp is used for imaging illumination. The luminance signal, therefore, has an excess red component with respect to, for example, 0.3R+0.59G+0.11B in the NTSC. With the color imaging device shown in FIG. 5, the quantity of the subtraction of red for separating the green signal becomes very large, and the S/N (signal-to-noise) ratio of the green signal is greatly and adversely affected by the red signal. On the other hand, if the R, B, Y system is employed for forming color difference signals from the luminance signal (3/2 R+2G+3/2 B) and the red and blue signals without demodulating the green signal, the S/N ratio may not be reduced, but there is an inevitable degradation in the color reproducibility.

Figure 13:
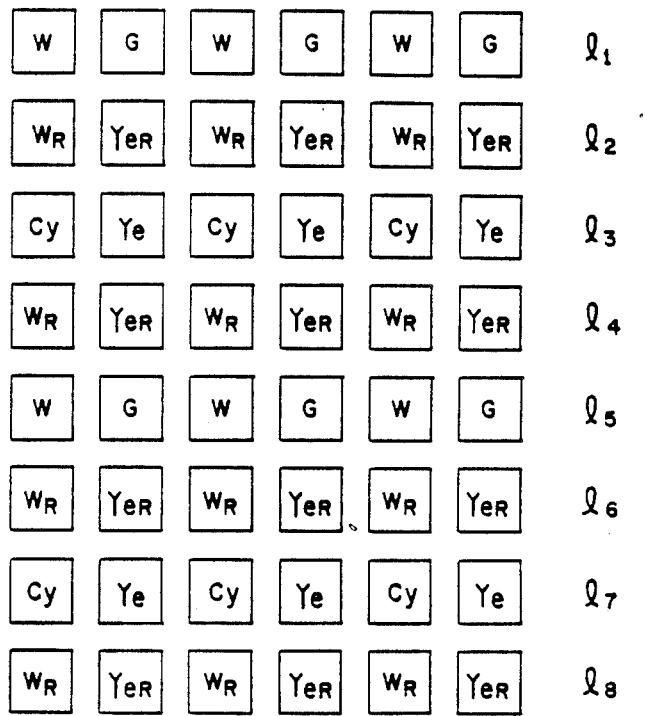

FIG. 13 is a schematic partial plan view of a seventh embodiment showing the arrangement of color filters and the mutual relationship between the color filters and picture elements, in a solid-state imaging apparatus. In FIG. 13, the plurality of picture elements are regularly arranged in a horizontal direction and a vertical direction. The color filters are formed on the respective picture elements. The letter W indicates the color filter which is transparent. The transparent color filter transmits blue, green and red light. The color filter G transmits green light, filter Ye transmits yellow light, namely, green and red light, and filter Cy transmits cyan light, namely, blue and green light. The color filters $W_R$ and $Ye_R$ exhibit the characteristics that transmission factors for the red light are controlled in a range of at least 25% to at most 75% of the red light that is transmitted by color filters W and Ye. They exhibit red transmission characteristics of 50% of the light that is transmitted by the color filters W and Ye, in the present embodiment.

Figure 14:
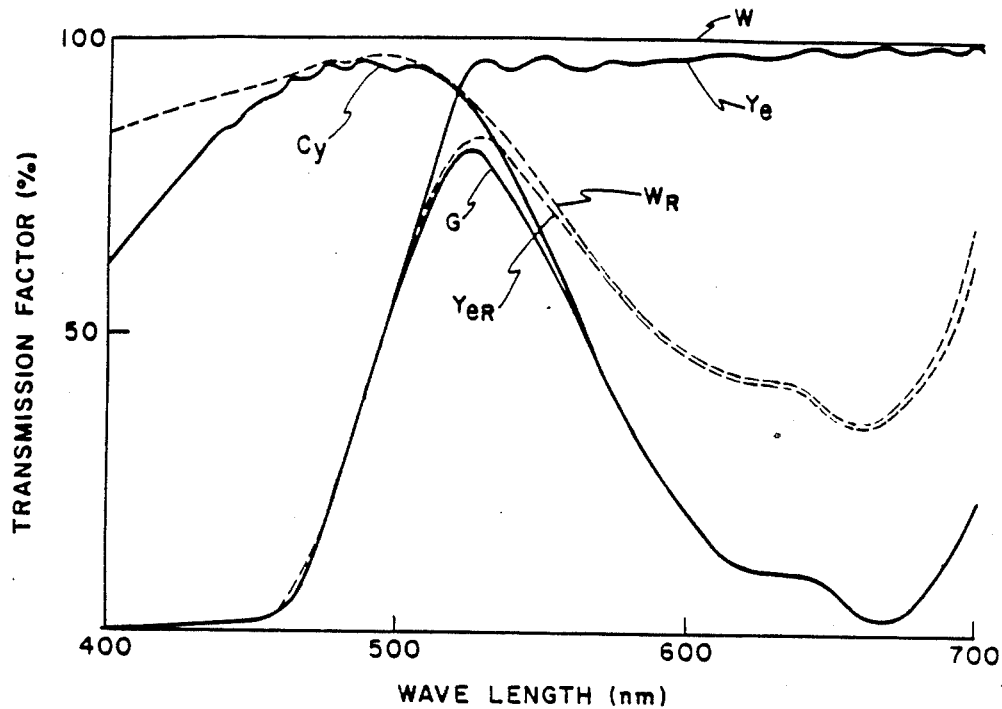
FIGS. 14, 18 and 19 are diagrams each showing the spectral characteristics of color filters.

The spectral characteristics of the respective color filters are illustrated in FIG. 14.

The color filters are arrayed at a cycle of two picture elements in the horizontal direction, and at a cycle of four picture elements in the vertical direction. Rows in the horizontal direction are identified as $l_1, l_2, l_3, \ldots, l_8$, . . . successively from a certain row. From the left toward the right in the horizontal direction, transparent and green filters W and G are repeatedly arranged in the horizontal rows $l_1$ and $l_5$, . . . ; filters $W_R$ and $Ye_R$ in the next rows $l_2$ and $l_6$, . . . ; filters Cy and Ye in the next rows $l_3$ and $l_7$, . . . ; and filters $W_R$ and $Ye_R$ in the next rows $l_4$ and $l_8$, . . . .

FIG. 15 is a diagram schematically showing the magnitudes of the outputs of the signals from the seventh embodiment. As illustrated in FIG. 15, the output signal of lines or rows $l_1+l_2$, the red signal is superposed as a modulation component $\tfrac{1}{2}$ R cos ωt with two picture elements forming one cycle in the horizontal direction. The blue signal is superposed as a modulation component B cos ωt with two picture elements forming one cycle in the horizontal direction.

On the other hand, a luminance signal which has the average value of the output signals is R+2G+B. This is, the output signal $S\{l_1+l_2\}$ of lines or rows $l_1+l_2$ is indicated by the following equation:

$$S\{l_1+l_2\}=R+2G+B+\tfrac{1}{2} R \cos \omega t+B \cos \omega t$$

In the output signal of lines or rows $l_3+l_4$, the red signal is modulated in the opposite phase and the blue signal is modulated in the same phase with respect to the corresponding components of the output signal of lines or rows $l_1+l_2$. The output signal $S\{l_3+l_4\}$ of lines or rows $l_3+l_4$ is indicated by the following equation:

$$S\{l_3+l_4\}=R+2G+B-\tfrac{1}{2} R \cos \omega t+B \cos \omega t$$

The outputs $S\{l_2+l_3\}$ and $S\{l_4+l_5\}$ of other fields are indicated by the following equations:

$$S\{l_2+l_3\}=R+2G+B-\tfrac{1}{2} R \cos \omega t+B \cos \omega t$$

$$S\{l_4+l_5\}=R+2G+B+\tfrac{1}{2} R \cos \omega t+B \cos \omega t$$

In lines or rows $l_2+l_3$ and $l_4+l_5$, the red signals are modulated in the opposite phases, and the blue signals in the same phases.

As is apparent from the above, the luminance signal can have the red component reduced sharply from, the luminance signal 3/2 R+2G+B described in conjunction with FIG. 6, to R+2G+B without any lowering in the modulation degrees of the red signal and the blue signal with respect to the color filter arrangement in the first and fourth embodiments. The above measure is based on reducing the red signal component with note taken of the fact that the rows $l_2, l_4, l_6$ and $l_8$ do not at all contribute to the modulation component of the red signal. Also, the red signals of these horizontal rows merely contribute to the luminance signal. In addition, there are six picture elements containing the red signals among either picture elements, which is to that in the prior art. The signal quantity of each of two of the six picture elements is reduced to ½. Four among the eight picture elements contain the blue signals, and the signal quantity is not changed at all. Even when a very fine pattern in red or blue enters, a faithful picture is obtained which is scarcely different from that in the prior art.

The seventh embodiment has been explained relative to the case where the red signal component derived from the filters $W_R$ or $Ye_R$ is 50% of the component derived from the filters W or Ye. When the percentage is below 25%, the red component of the luminance signal is further reduced, and it can be expected to enhance the S/N (signal-to-noise) ratio and the color reproducibility. With such a slight component of the red signal, however, the picture element containing the red signal or the sampling point of red is no longer useful, and the faithful reproduction of a very fine pattern becomes difficult. In contrast, when the percentage of the red signals derived from the filters $W_R$ or $Ye_R$ is above 75%, the effect of reducing the component of the red signal in the luminance signal is hardly achieved, and the enhancements of the S/N ratio and the color reproducibility cannot be desired over the color filter arrangement in FIG. 6. Thus, the proper red signal components of filters $W_R$ and $Ye_R$ are in the range of at least 25% to at most 75% of the components of filters W and Ye.

Using the output signals from the solid-state imaging element of the solid-state imaging device which is the embodiment according to the present invention, a color television signal is produced by a device similar to the single-plate color imaging apparatus as shown in FIG. 5.

The filters in FIG. 13 can be readily realized in practice in such a way that the rows $l_2$, $l_4$, $l_6$ and $l_8$ are formed by the repetition of the transparent and yellow color filters W and Ye, similar to the prior art. Thin cyan filters by which the transmission factor for the red component is at least 25% to at most 75% are superposed on the respective horizontal rows.

Figure 17:
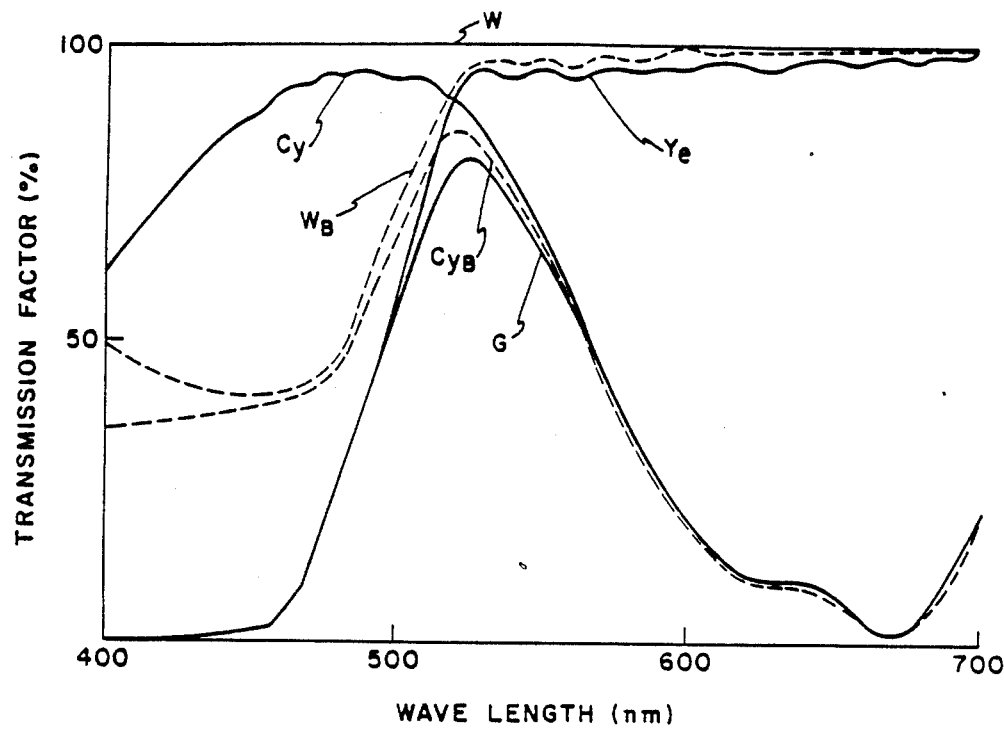

FIG. 16 is a schematic partial plan view showing the layout of color filters and the mutual relationships between the color filters and picture elements in a solid-state imaging apparatus, according to an eighth embodiment of this invention. The color filters are arrayed at a cycle of two picture elements in the horizontal direction and a cycle of four picture elements in the vertical direction. The transparent-blue and cyan-blue color filters $W_B$ and $Cy_B$ exhibit the characteristics that transmission factors for blue are controlled in a range of at least 25% to at most 75% of the blue transmission factor of the color filter $W_R$. In the present embodiment, they exhibit blue transmission characteristics of 50% of the blue transmission characteristics of the color filter $W_R$. The color filters $W_R$ and $Ye_R$ exhibit the red transmission characteristics of 50% of the red transmission characteristics of the color filter $W_B$ as in the foregoing embodiment. Spectral transmission is depicted in FIG. 17 for the color filters used in FIG. 16.

The color filters are arranged by repeating filters $W_B$ and $Cy_B$ in rows $l_1$ and $l_5$, ...; filters $W_R$ and $Ye_R$ in the next rows $l_2$ and $l_6$, ...; filters $Cy_B$ and $W_B$ in the next rows $l_3$ and $l_7$, ...; and filters $W_R$ and $Ye_R$ in the next rows $l_4$ and $l_8$, ....

The output signals of respective horizontal scanning lines in the field storage operation are indicated by the following equations:

$$S\{l_1 + l_2\} = R + 2G + B + \tfrac{1}{2}R\cos\omega t + \tfrac{1}{2}B\cos\omega t$$
$$S\{l_3 + l_4\} = R + 2G + B - \tfrac{1}{2}R\cos\omega t + \tfrac{1}{2}B\cos\omega t$$
$$S\{l_2 + l_3\} = R + 2G + B - \tfrac{1}{2}R\cos\omega t + \tfrac{1}{2}B\cos\omega t$$
$$S\{l_4 + l_5\} = R + 2G + B + \tfrac{1}{2}R\cos\omega t + \tfrac{1}{2}B\cos\omega t$$

In the adjacent horizontal scanning line periods, the blue signals are modulated in the same phases, and the red signals in the opposite phases. Also, in the present embodiment, both the red and blue signal components decrease to give a luminance signal $R+2G+B$ in contrast to the luminance signal $3/2\,R+2G+3/2\,B$ described in connection with FIG. 8 employing the color filters, W, Cy and Ye. The modulation components of the signals R and B are equal to those described above. Thus, the S/N ratios of the color signals of red and blue do not degrade. The color reproducibility is good, and a faithful picture which scarcely differs from that in the prior art is produced for a very fine pattern in red or blue.

The filters in FIG. 16 can be readily realized in practice in such a way that, after the yellow and cyan Ye and Cy filters have been formed, thin yellow filters, with which the transmission factor for the blue component becomes at least 25% to at most 75%, are superposed on the respective horizontal rows $l_1$, $l_3$, $l_5$, $l_7$, .... Thin cyan filters having the transmission factor for the red component becomes at least 25% to at most 75% and are superposed on the respective horizontal rows $l_2$, $l_4$, $l_6$, $l_8$, ....

Figure 19:
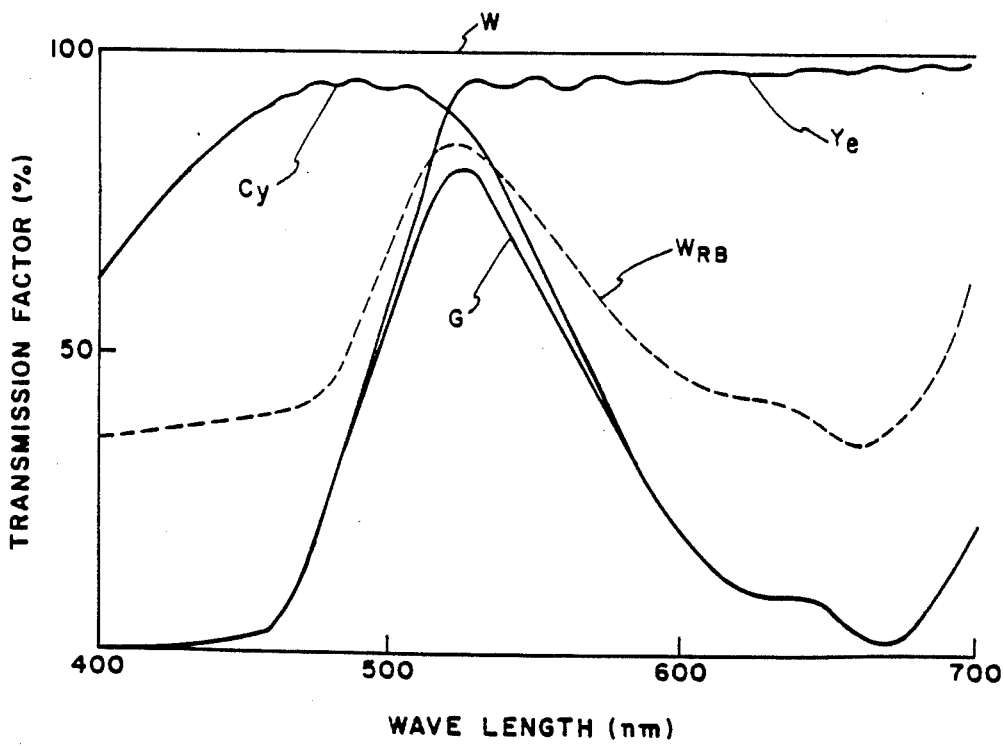

FIG. 18 is a schematic partial plan view showing the layout of color filters and the mutual relationships between the color filter and picture elements in a solid-state imaging apparatus, according to a ninth embodiment of the present invention. The color filters are arrayed at a cycle of two picture elements in the horizontal direction, and at a cycle of four picture elements in the vertical direction. The filter W transmits red, green and blue light, filter G green light, filter Cy blue and green light, and filter Ye green and red light. The filter $W_{RB}$ exhibits the characteristics that transmission factors for the red and blue lights are respectively controlled to at least 25% to at most 75% with respect to those of the filter W. In the present embodiment, filter $W_{RB}$ exhibits transmission characteristics of 50% for both red and blue in comparison with those of the filter W as illustrated in FIG. 19.

The color filters are arrayed by the repetition of filters W and G in lines or rows $l_1$ and $l_5$, ...; by the continuation of filter $W_{RB}$ throughout the horizontal direction in lines or rows $l_2$, $l_4$, $l_6$, and $l_8$, ...; and the repetition of filters Cy and Ye in lines or rows $l_3$ and $l_7$, ....

The output signals of respective horizontal scanning lines in the field storage operation are indicated by the following equations:

$$S\{l_1 + l_2\} = R + 2G + B + \tfrac{1}{2}R\cos\omega t + \tfrac{1}{2}B\cos\omega t$$
$$S\{l_3 + l_4\} = R + 2G + B - \tfrac{1}{2}R\cos\omega t + \tfrac{1}{2}B\cos\omega t$$
$$S\{l_2 + l_3\} = R + 2G + B - \tfrac{1}{2}R\cos\omega t + \tfrac{1}{2}B\cos\omega t$$
$$S\{l_4 + l_5\} = R + 2G + B + \tfrac{1}{2}R\cos\omega t + \tfrac{1}{2}B\cos\omega t$$

In the adjacent horizontal scanning line periods, the blue signals are modulated in the same phases, and the red signals in the opposite phases. Also, in the present embodiment, both the red and blue signal components decrease to afford a luminance signal R+2G+B in contrast to the luminance signal 3/2 R+2G+3/2 B described in conjunction with FIG. 8 employing the color filters W, Cy and Ye. Meanwhile, the modulation components of the signals R and B are quite equal to those in the prior art. Thus, the S/N ratios of the color signals of red and blue do not degrade, and the color reproducibility is good. Besides, a faithful picture which is scarcely different from that in the prior art is produced for a very fine pattern in red or blue.

The filters in FIG. 18 can be readily realized in practice in such a way that, after the white filters W have been formed, thin yellow and cyan filters are superposed along the horizontal rows $l_2$, $l_4$, $l_6$, $l_8$, and so forth. The thin yellow filters are such that transmission factor for the blue component becomes at least 25% to at most 75%. Thin cyan filters are such that transmission factor for the red component becomes at least 25% to at most 75%.

The output signals from the solid-state imaging element of the solid-state imaging apparatus of the eight or nine embodiments produce a color television signal by the use of a device similar to the single-phase type color imaging apparatus as shown in FIG. 5. Moreover, they produce a quite similar color television signal by the use of a method wherein signals delivered in units of the picture elements of each horizontal scanning line and signals are delayed by 1H by means of a CCD delay line. These signals are respectively sampled and held, red and blue signals are separated by a matrix calculation, and a luminance signal is separated by a low-pass filter.

In case of a color filter arrangement in which the positions of the cyan filters Cy and the yellow filters Ye are replaced with each other in the color filter arrangement shown in FIGS. 13, 16 or 17, the effects intended by the invention are similarly achieved by quite the same technique. Needless to say, even when applied to a frame transfer CCD imaging element, the invention brings forth quite the same effects as in the interline transfer CCD.

Those who are skilled in the art will readily perceive how to modify the invention. Therefore, the appended claims are to be construed to cover all equivalent structures which fall within the true scope and spirit of the invention.

What is claimed is:

1. An array of color filters for controlling the color of light falling on a corresponding array of picture elements in a solid-state imaging apparatus, said color filters and said picture elements being arrayed in rows and columns with two horizontally adjacent and four vertically adjacent color filters making a recurring cycle of eight color filters, said color filters being arranged so that the picture elements arranged along each row corresponding to said recurring cycle of eight color filters contain at least one picture element for generating an output signal representative of red light and at least one picture element for generating an output signal representative of blue light, wherein said recurring cycle comprises a first vertical column of two white filters, a yellow filter and a white filter adjacent a second vertical column of a green filter, a white filter, a cyan filter and a white filter, individual color filters in said first and second vertical columns being respectively next to each other to form four horizontal rows, each with two color filters.

2. An array of color filters for controlling the color of light falling on a corresponding array of picture elements in a solid-state imaging apparatus, said color filters and said picture elements being arrayed in rows and columns with two horizontally adjacent and four vertically adjacent color filters making a recurring cycle of eight color filters, said color filters being arranged so that the picture elements arranged along each row corresponding to said recurring cycle of eight color filters contain at least one picture element for generating an output signal representative of red light and at least one picture element for generating an output signal representative of blue light, wherein said recurring cycle comprises a first vertical column of two white filters, a cyan filter and a white filter adjacent a second vertical column of a green filter, a white filter, a yellow filter, and a white filter, individual color filters in said first and second vertical columns being respectively next to each other to form four horizontal rows, each with two color filters.

3. An array of color filters for controlling the color of light falling on a corresponding array of picture elements in a solid-state imaging apparatus, said color filters and said picture elements being arrayed in rows and columns with two horizontally adjacent and four vertically adjacent color filters making a recurring cycle of eight color filters, said color filters being arranged so that the picture elements arranged along each row corresponding to said recurring cycle of eight color filters contain at least one picture element for generating an output signal representative of red light and at least one picture element for generating an output signal representative of blue light, wherein said recurring cycle comprises a first vertical column of a first type of white filter, a second type of white filter, a cyan filter and a second type of white filter adjacent a second vertical column of a green filter, a first type of yellow filter, a second type of yellow filter, and a first type of yellow filter, the second type of white filter transmitting red light in the range of 25%-75% of the red light transmitted by the first type of white filter, and the first type of yellow filter transmitting red light in the range of 25%-75% of the red light transmitted by the second type of yellow filter, individual color filters in said first and second vertical columns being respectively next to each other to form four horizontal rows, each with two color filters.

4. An array of color filters for controlling the color of light falling on a corresponding array of picture elements in a solid-state imaging apparatus, said color filters and said picture elements being arrayed in rows and columns with two horizontally adjacent and four vertically adjacent color filters making a recurring cycle of eight color filters, said color filters being arranged so that the picture elements arranged along each row corresponding to said recurring cycle of eight color filters contain at least one picture element for generating an output signal representative of red light and at least one picture element for generating an output signal representative of blue light, wherein said recurring cycle comprises a first vertical column of a first type of white filter, a second type of white filter, a cyan filter and a second type of white filter adjacent a second vertical column of a cyan filter, a yellow filter, a first type of white filter and a yellow filter, the second type of white filter and the yellow filter transmitting red light in the range of 25%-75% of the red light transmitted by a white filter, and the cyan filter and the first type of white filter transmitting blue light in the range of 25%–75% of the blue light transmitted by a white filter, individual color filters in said first and second vertical columns being respectively next to each other to form four horizontal rows, each with two color filters.

5. An array of color filters for controlling the color of light falling on a corresponding array of picture elements in a solid-state imaging apparatus, said color filters and said picture elements being arrayed in rows and columns with two horizontally adjacent and four vertically adjacent color filters making a recurring cycle of eight color filters, said color filters being arranged so that the picture elements arranged along each row corresponding to said recurring cycle of eight color filters contain at least one picture element for generating an output signal representative of red light and at least one picture element for generating an output signal representative of blue light, wherein said recurring cycle comprises a first vertical column of a first type of white filter, a second type of white filter, a cyan filter and a second type of white filter adjacent a second vertical column of a green filter, a second type of white filter, a yellow filter, and a second type of white filter, the second type of white filter transmitting red and blue light in the range of 25%–75% of both the red and blue light transmitted by the first type of white filter, individual color filters in said first and second vertical columns being respectively next to each other to form four horizontal rows, each with two color filters.

6. An array color filter arrangement for a solid-state imaging apparatus comprising a plurality of picture elements arranged in horizontal rows and vertical columns, a plurality of vertical register means associated with the columns of picture elements for transferring charges from said columns of picture elements toward ends of the respective columns, horizontal register means at said ends of said vertical columns for serially transferring said charges from said plurality of vertical register means to form an output signal for each row of picture elements, and an array of color filters positioned in front of said picture elements to control the amount of said charges as a function of the color of image light falling on said picture elements, a horizontal arrangement of said color filters repeating after each two columns and a vertical arrangement of said color filters repeating after each four rows, whereby a resulting cycle of eight color filters has a width of two filters and a height of four filters, said cycle of color filters being repeated said array of color filters, with at least one red transmitting color filter in each row of each cycle, wherein output signals of each five rows of picture elements $l_1, l_2, l_3, l_4, l_5$ are grouped to provide interlaced picture signals in a manner described by the formulas:

$$S\{l_1 + l_2\} = R + 2G + B + \tfrac{1}{2} R \cos\omega t + B \cos\omega t,$$

$$S\{l_3 + l_4\} = R + 2G + B - \tfrac{1}{2} R \cos\omega t + B \cos\omega t,$$

$$S\{l_2 + l_3\} = R + 2G + B - \tfrac{1}{2} R \cos\omega t + B \cos\omega t, \text{ and}$$

$$S\{l_4 + l_5\} = R + 2G + B + \tfrac{1}{2} R \cos\omega t + B \cos\omega t,$$

where $R$ = a signal representative of red light, $G$ = a signal representative of green light, and $B$ = a signal representative of blue light.

7. An array color filter arrangement for a solid-state imaging apparatus comprising a plurality of picture elements arranged in horizontal rows and vertical columns, a plurality of vertical register means associated with the columns of picture elements for transferring charges from said columns of picture elements toward ends of the respective columns, horizontal register means at said ends of said vertical columns for serially transferring said charges from said plurality of vertical register means to form an output signal for each row of picture elements, and an array of color filters positioned in front of said picture elements to control the amount of said charges as a function of the color of image light falling on said picture elements, a horizontal arrangement of said color filters repeating after each two columns and a vertical arrangement of said color filters repeating after each four rows, whereby a resulting cycle of eight color filters has a width of two filters and a height of four filters, said cycle of color filters being repeated throughout said array of color filters, with at least one red transmitting color filter in each row of each cycle, wherein output signals of each five rows of picture elements $l_1, l_2, l_3, l_4, l_5$ are grouped to provide interlaced picture signals in a manner described by the formulas:

$$S\{l_1 + l_2\} = R + 2G + B + \tfrac{1}{2} R \cos\omega t + \tfrac{1}{2} B \cos\omega t,$$

$$S\{l_3 + l_4\} = R + 2G + B - \tfrac{1}{2} R \cos\omega t + \tfrac{1}{2} B \cos\omega t,$$

$$S\{l_2 + l_3\} = R + 2G + B - \tfrac{1}{2} R \cos\omega t + \tfrac{1}{2} B \cos\omega t, \text{ and}$$

$$S\{l_4 + l_5\} = R + 2G + B + \tfrac{1}{2} R \cos\omega t + \tfrac{1}{2} B \cos\omega t,$$

where $R$ = a signal representative of red light, $G$ = a signal representative of green light, and $B$ = a signal representative of blue light.

* * * * *